United States Patent [19]

Mori et al.

[11] 4,171,880
[45] Oct. 23, 1979

[54] ZOOM LENS SYSTEM FOR CAMERAS

[75] Inventors: Shigemitsu Mori; Takao Koda, both of Omiya, Japan

[73] Assignee: Fuji Photo Optical Co., Ltd., Omiya, Japan

[21] Appl. No.: 857,904

[22] Filed: Dec. 6, 1977

[30] Foreign Application Priority Data

Dec. 9, 1976 [JP] Japan .................... 51-165114[U]

[51] Int. Cl.² .................... G02B 15/18; G02B 7/04
[52] U.S. Cl. .................................. 350/187; 350/255
[58] Field of Search .................. 350/187, 255, 44

[56] References Cited

U.S. PATENT DOCUMENTS

| | | | |
|---|---|---|---|
| 3,169,461 | 2/1965 | Erbe et al. | 350/187 |
| 3,877,793 | 4/1975 | Nakagawa | 350/255 |
| 3,915,557 | 10/1975 | Shimojima | 350/187 |
| 3,944,340 | 3/1976 | Hashimoto | 350/255 |
| 4,002,402 | 1/1977 | Mito | 350/187 |

*Primary Examiner*—Jon W. Henry
*Attorney, Agent, or Firm*—Gerald J. Ferguson, Jr.; Joseph J. Baker

[57] ABSTRACT

A zoom lens system has a zoom lens holder which varies its length as the focal length is varied. The zoom lens holder includes a fixed ring, an axially movable ring disposed within the fixed ring to which a front lens holder is screwed, and a rotatable cam ring disposed around the fixed ring. The axially movable ring is engaged with the rotatable cam ring by means of a pin fixed to the outer face of the movable ring and slidably engaged with a helical cam groove of the cam ring. The pin radially extends through an axially extending key slot provided in the fixed ring and thereby prevents the movable ring from rotating about the optical axis of the zoom lens system. As the movable ring axially moves, the cam ring is rotated. A rear lens holder is axially movable within the movable ring and is engaged with the cam ring by means of an engaging pin fixed to the rear lens holder and a helical cam groove provided in the cam ring. The engaging pin radially extends through axially extending key slots provided in the movable ring and the fixed ring respectively. An actuating ring is secured to the front lens holder to be axially moved for zooming and rotated for focusing. Hence, the front lens holder and the rear lens holder are moved in the opposite directions in a zooming operation effected by the axial movement of the actuating ring.

6 Claims, 4 Drawing Figures

ZOOM LENS SYSTEM FOR CAMERAS

BACKGROUND OF THE INVENTION

1. Field of the Invention

This invention relates to a zoom lens system, and more particularly to a range and focus controlling means in a zoom lens holder for use in a photographic, motion picture or television camera.

2. Description of the Prior Art

In the conventional zoom lens holder, it has been known to effect both a range and focus control by means of a single operating member. As shown in U.S. Pat. No. 3,169,461, it is known to vary the focal length of a zoom lens by an axial movement of an actuating ring and adjust the focus thereof by a rotary movement of the actuating ring.

In order to make the whole size of a camera as compact as possible, it is desired to make the size of a zoom lens system in a motion picture camera or the like as small as possible. In the above cited prior art, the length of the zoom lens system is not changed when the focal length thereof is changed, since the front lens component of the zoom lens system is fixed at a position during the zooming operation.

SUMMARY OF THE INVENTION

It is, therefore, an object of the present invention to provide a zoom lens system which is compact in size.

It is a specific object of the present invention to provide a zoom lens system the length of which is variable in accordance with the zooming operation.

It is still another object of the present invention to provide a zoom lens holder provided with a range and focus controlling member which is rotated for focusing and axially moved for zooming.

The zoom lens system in accordance with the present invention varies its length when the focal length is varied. Accordingly, the whole size of the camera with the zoom lens system can be made compact by minimizing the length of the zoom lens system. Hence, a camera with a zoom lens system in accordance with this invention is convenient for carrying. Further, the zoom lens system in accordance with the present invention is provided with a single actuating member for focusing and varying the focal length.

A preferred embodiment of the present invention is further provided with means for enabling close-up photography by which the lens components are moved over the wide angle limit and photographing or filming of an object at a very short distance is made possible.

DESCRIPTION OF THE PREFERRED EMBODIMENTS

Figure 1:
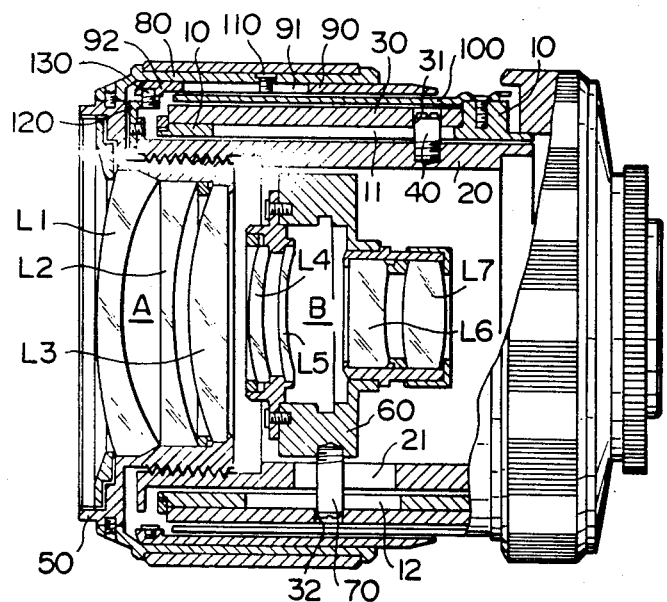
FIG. 1 is a longitudinal view almost in section of a zoom lens system in accordance with an embodiment of the present invention.

FIG. 1 shows a preferred embodiment of the present invention in which a zoom lens system consisting of a front lens group A composed of lenses L1 to L3 and a rear lens group B composed of lenses L4 to L7 is supported in a zoom lens holder. The zoom lens holder has a structure for moving the front lens group A axially back and forth for focusing and move the front and the rear lens groups A and B in the opposite directions for zooming. The zoom lens holder includes a fixed ring 10, an axially movable ring 20 disposed within the fixed ring 10, and a rotatable cam ring 30 disposed around the fixed ring 10. The axially movable ring 20 and the rotatable cam ring 30 are coupled together by means of a pin 40 which is fixed to the outer face of the movable ring 20 and slidably engaged with a helical cam groove 31 of the cam ring 30. The pin 40 radially extends through an axially extending key slot 11 provided in the fixed ring 10 and thereby prevents the movable ring 20 from rotating about the optical axis of the zoom lens system. As the movable ring 20 moves axially along the optical axis, the cam ring 30 is rotated by the engagement of the pin 40 and the cam groove 31.

The front lens group A is supported by a front lens holder 50 and the rear lens group B is supported by a rear lens holder 60. The front lens holder 50 is screw engaged with the movable ring 20 so that the front lens holder 50 may be rotated within the movable ring 20 for focusing. The rear lens holder 60 is axially movable back and forth within the movable ring 20 and is engaged with said cam ring 30 by means of an engaging pin 70 fixed to the outer periphery of the rear lens holder 60 and a helical cam groove 32 provided in the cam ring 30 with which the engaging pin 70 is slidably engaged. The engaging pin 70 radially extends through axially extending comparatively wide key slots 21 and 12 provided in the movable ring 20 and the fixed ring 10 respectively. The front lens holder 50 is secured to an actuating ring 80 so that the former may be moved together with the latter.

A distance scale ring 90 is provided inside the actuating ring 80 and has an axially extending key slot 91 with which an engaging pin 110 fixed to the inner face of the actuating ring 80 is slidably engaged. The distance scale ring 90 further has a peripheral groove 92 on the inner face thereof with which an engaging member 130 secured to a flange 120 fixed to the front end of said movable ring 20 is slidably engaged. Thus, when the actuating ring 80 is axially moved back and forth, the movable ring 20 and the distance scale ring 90 are also moved back and forth together therewith. When the actuating ring 80 is rotated, the front lens holder 50 is also rotated and slightly moved back and forth for focusing, but the movable ring 20 is not moved. The distance scale ring 90 is rotated together with the actuating ring 80 and is also moved back and forth. In this focusing operation, therefore, the rotary movement of the distance scale ring 90 is guided by the slidable engagement of the peripheral groove 92 and the engaging member 130. A zoom scale ring 100 is disposed inside the distance scale ring 90 and is secured to the fixed ring 10.

In operation of the above described embodiment of the invention, the actuating ring 80 is rotated for focusing and axially moved back and forth for zooming.

In the focusing operation, the actuating ring 80 is rotated to rotate the front lens holder 50 and move the same axially by means of the screw engagement between the front lens holder 50 and the movable ring 20. By moving the front lens holder 50 axially, the front lens group A is axially moved for focusing. At this time, the distance scale ring 90 is rotated together with the actuating ring 80 but is not moved axially. Therefore, the distance can be read on the distance scale ring 90 with reference to an index provided on the zoom scale ring 100.

In the zooming operation, the actuating ring 80 is axially moved back and forth to move the front lens holder 50 axially. As the front lens holder 50 axially moves, the movable ring 20 is also moved axially. As the movable ring 20 moves axially, the cam ring 30 with which the pin 40 engages is rotated around the fixed ring 10. As the cam ring 30 rotates, is axially moved the rear lens holder 60 whose engaging pin 70 is engaged with the helical cam groove 32 through the axially extending key slot 12 of the fixed ring 10. If the helical cam grooves 31 and 32 are so formed that the engaging pin 70 is moved to the right in FIG. 1 when the movable ring 20 is moved to the left, the front lens group A and the rear lens group B are moved axially in the opposite directions. Thus, by axially moving the actuating ring 80, the lens groups are moved for zooming. By moving the actuating ring 80 forward, the wide zooming is effected and by moving the same rearward the tele-zooming is effected. Since at this time the distance scale ring 90 is also moved axially together with the actuating ring 80 as mentioned hereinbefore, the focal length effected by the zooming can be read on the zoom scale ring 100 with reference to the rear end of the distance scale ring 90 moving along the outer face of the zoom scale ring 100.

A second embodiment of the present invention will be described hereinbelow with reference to FIGS. 2 to 4. This embodiment has a close-up photographing means in addition to the structure of the first embodiment shown in FIG. 1. All the elements equivalent to those shown in FIG. 1 are designated with the same reference numerals and the description thereof will be omitted. This embodiment is further provided with means for facilitating the focusing in the close-up photography range.

Figure 3:
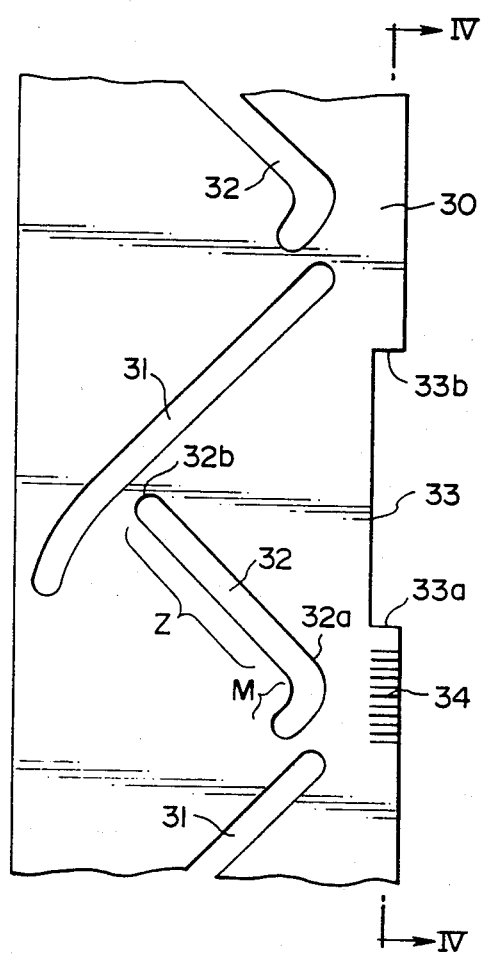
FIG. 3 is a developed view of a cam ring employed in the second embodiment of the invention.

Referring to FIG. 3, the helical cam groove 32 for moving the rear lens holder 60 in this embodiment continues into a macro portion M for close-up photographing at the wide angle side end of the ordinary zooming portion Z thereof. Further, the cam ring 30 has a cut-away portion 33 on the rear end thereof as shown in FIGS. 3 and 4. The length of the cut-away portion 33 of the cam ring 30 corresponds to the ordinary zooming range. Adjacent to one end 33a of the cut-away portion 33 of the cam ring 30, the outer face of the cam ring 30 is provided with knurling 34 which serves as a click stop in the close-up photographing range.

Figure 2:
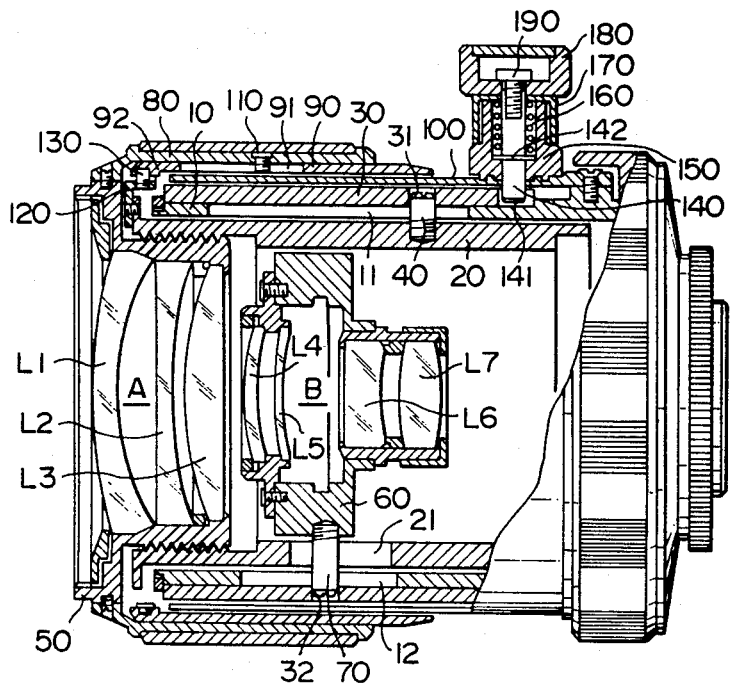
FIG. 2 is a longitudinal view almost in section of a zoom lens system in accordance with a second embodiment of the present invention.

Referring to FIG. 2, an engaging pin 140 is provided on the zoom scale ring 100 and is spring urged radially inward so that the end 141 of the pin 140 is pressed on the outer surface of the cam ring 30 when the cam ring 30 is rotated to such a degree that the end 33a of the cut-away portion 33 moves beyond the position of the pin 140. Thus, the end 141 of the pin 140 is in pressure engagement with the knurling 34 to effect click stop of the cam ring 30. The pin 140 is movable radially in a cylindrical body 150 fixed to the zoom scale ring 100 and is spring urged radially inward with a coil spring 160 retained within the cylindrical body 150. In more detail, the pin 140 has at its upper end a flange 142 which abuts on the lower end of the cylindrical space within the cylindrical body 150 and is pressed downward by the lower end of said coil spring 160. A cover sleeve 170 is screwed on the cylindrical body 150 to hold the coil spring 160 within said space so that the coil spring 160 is compressed between the upper end of the cover sleeve 170 and the flange 142 of the pin 140. Further, a knob 180 is fixed to the upper end of the cover sleeve 170 by means of a fixing nut 190.

Figure 4:
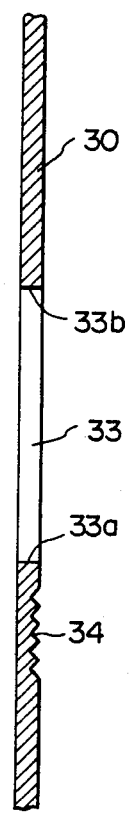
FIG. 4 is a cross sectional view taken along line IV—IV of FIG. 3.

In operation of the above described close-up photographing means shown in FIGS. 2 to 4, the cam ring 30 is freely rotatable in the range between the tele-side end where the pin 140 abuts on one end 33b of the cut-away portion 33 and the wide-side end where the pin 140 abuts on the other end 33a of the cut-away portion 33. The zooming operation is conducted in this freely rotatable range. In taking a close-up picture, the actuating ring 80 is moved forward in the direction of wide zooming until the pin 140 abuts on the wide-side end 33a of the cut-away portion 33 of the cam ring 30. Then the knob 180 is pulled outward overcoming the force of the coil spring 160 and the actuating ring 80 is further moved forward to rotate the cam ring 30 and then the knob 180 is released. Thus, there is achieved a switch-over from ordinary zooming operation to close-up operation. Thereafter, if necessary, the knob 180 is again pulled outward to allow the rotation of the cam ring 30, and the actuating ring 80 is moved back and forth to find an approximately focusing position. Then, the knob 180 is released to hold the cam ring 30 in the approximately focusing position by the click stop means. After the approximate focusing has been completed, the actuating ring 80 is rotated to move the front lens group A for final focusing.

We claim:

1. A zoom lens holder for a zoom lens system consisting of a front lens group and a rear lens group which are moved axially in opposite directions for zooming and in which only the front lens group is axially moved for focusing, wherein said zoom lens holder comprises:
   a fixed ring enclosing a zoom lens system therein having an axis of symmetry coinciding with an optical axis of the zoom lens system, said fixed ring having an axially extending key slot,
   a cam ring rotatably mounted around said fixed ring having two kinds of helical cam grooves,
   an axially movable ring disposed within said fixed ring having an interlocking member which extends through said axially extending key slot of the fixed ring to prevent rotation of the axially movable ring and is engaged with one of said two kinds of helical cam grooves,
   a front lens holder disposed within a front end portion of said axially movable ring and screw-engaged therewith for holding and axially moving a front lens group of the zoom lens system,
   a rear lens holder disposed within said axially movable ring behind said front lens holder for holding and axially moving a rear lens group of the zoom lens system, said rear lens holder having an interlocking member which extends through axially extending key slots provided in said axially movable ring and said fixed ring respectively and is engaged with the other kind of said helical cam grooves, and
   a manually operable actuating ring secured to said front lens holder which is manually rotatable about the optical axis of the zoom lens system and also manually movable in the axial direction of the optical axis independent of its rotatability about the optical axis, wherein the zooming operation is effected by axially moving said actuating ring and the focusing operation is effected by rotating the same.

2. A zoom lens holder for a zoom lens system as defined in claim 1 further comprising a zoom scale ring disposed between said cam ring and said actuating ring, and a distance scale ring disposed between said actuating ring and said zoom scale ring, said zoom scale ring being fixed to said fixed ring and carrying a zoom scale on the outer surface thereof extending axially, said distance scale ring having an axially extending key slot with which a pin fixed to the inner face of the actuating ring is slidably engaged, said distance scale ring further having a peripheral groove on its inner face with which a member fixed to said axially moving ring is slidably engaged, whereby the distance scale ring is axially moved together with said actuating ring and said axially movable ring, and is rotatable together with said actuating ring while allowing an axial slide of the distance scale ring with respect to the actuating ring.

3. A zoom lens holder for a zoom lens system as defined in claim 1 wherein said helical cam groove engaged with the interlocking member of the rear lens holder has a close-up photographic portion in addition to an ordinary zooming portion at its wide angle side end thereof, said cam ring is provided with means for limiting the rotation thereof in the range of the ordinary zooming operation, and release means is provided for allowing the cam ring to rotate beyond the limit of rotation limited by said limiting means.

4. A zoom lens holder for a zoom lens system as defined in claim 3 wherein said limiting means comprises a cut-away portion having two limit ends provided at an edge of said cam ring and a pin spring-urged to be in engagement with said cut-away portion, and said release means comprises a manually operable knob connected with said pin to disengage the pin from the cut-away portion.

5. A zoom lens holder for a zoom lens system as defined in claim 4 wherein said cam ring is provided with a knurled portion adjacent to said cut-away portion to be engaged with said spring-urged pin when the cam ring is rotated beyond said limit.

6. A zoom lens holder for a zoom lens system as defined in claim 5 wherein said knurled portion has a length in which the cam ring is rotatable to roughly adjust the focus for the close-up photographing operation.

* * * * *